United States Patent [19]

Ryan

[11] 4,399,874
[45] Aug. 23, 1983

[54] AGRICULTURAL TOOL SHANK AND SPRING RELEASE

[75] Inventor: John W. Ryan, Yowie Bay, Australia

[73] Assignee: Agrowplow Pty Limited, Australia

[21] Appl. No.: 174,176

[22] Filed: Jul. 31, 1980

Related U.S. Application Data

[63] Continuation of Ser. No. 932,023, Aug. 8, 1978, abandoned.

[30] Foreign Application Priority Data

Aug. 9, 1977 [AU] Australia .............................. PD1154

[51] Int. Cl.³ ....................... A01B 23/02; A01B 61/04
[52] U.S. Cl. .................................... 172/269; 172/710; 172/773; 172/749
[58] Field of Search ............... 172/699, 753, 763, 749, 172/719, 275, 768, 766, 773, 774, 775, 691, 697, 700, 771, 694, 708

[56] References Cited

U.S. PATENT DOCUMENTS

| | | | |
|---|---|---|---|
| 565,352 | 8/1896 | Hickman | 172/699 |
| 614,177 | 11/1898 | McBride | 248/224.2 |
| 1,237,610 | 8/1917 | Brenno | 172/766 X |
| 2,093,123 | 9/1937 | Davenport | 172/699 X |
| 2,703,518 | 3/1955 | Whitmore | 172/699 X |
| 3,141,508 | 7/1964 | McMullen | 172/ |
| 3,202,222 | 8/1965 | Norris | 172/699 X |
| 3,398,799 | 8/1968 | Richey | 172/699 |
| 3,912,020 | 10/1975 | Rockwell | 172/699 |
| 3,931,858 | 1/1976 | North | 172/63 |
| 4,079,789 | 3/1978 | Byrd | 172/254 |

OTHER PUBLICATIONS

SAE Standard Nomenclature-Rippers, Rooters, Scarifiers SAE j733b 7/73, p. 41.27.

Primary Examiner—Richard J. Johnson
Attorney, Agent, or Firm—Ladas & Parry

[57] ABSTRACT

A plough shank having a rounded leading edge portion with a leading surface, a trailing portion, a web connecting the trailing and leading portions, an attachment mechanism at the top of the shank to enable attachment of the shank to a plough frame so that the leading surface is inclined by 60° to 80° to the horizontal, and a construction at the bottom of the shank to enable the attaching of a digging point thereto. The attachment mechanism may comprise a lobe integral with the shank and received in a clamp for attachment to a tool bar. The clamp may include two pivotably connected portions with an interconnected spring or hydraulic system.

18 Claims, 18 Drawing Figures

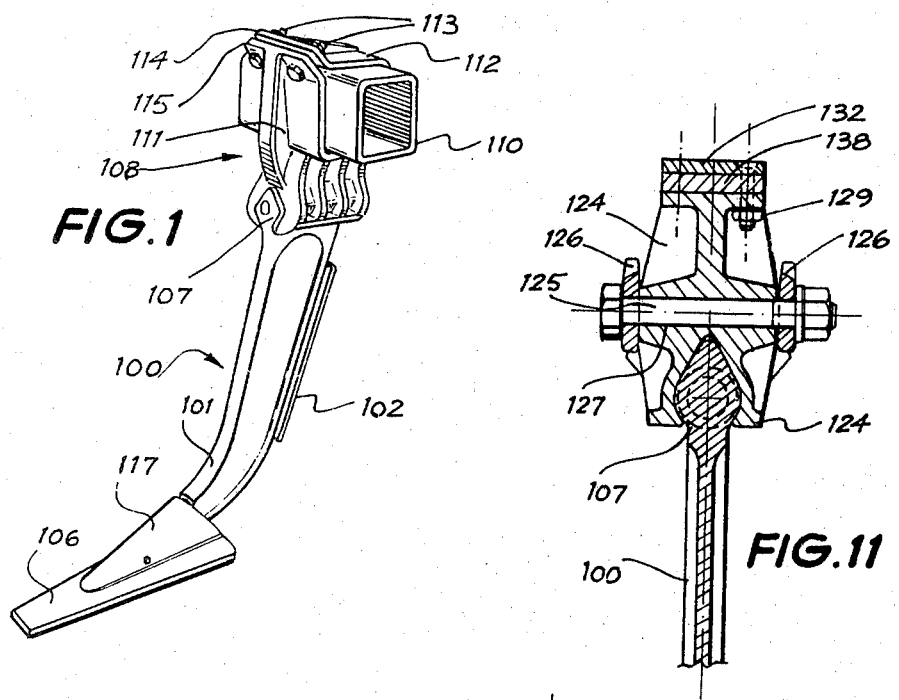
FIG. 1
FIG. 11
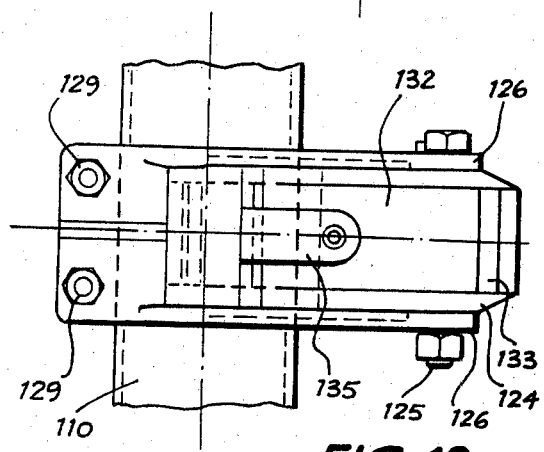
FIG. 12
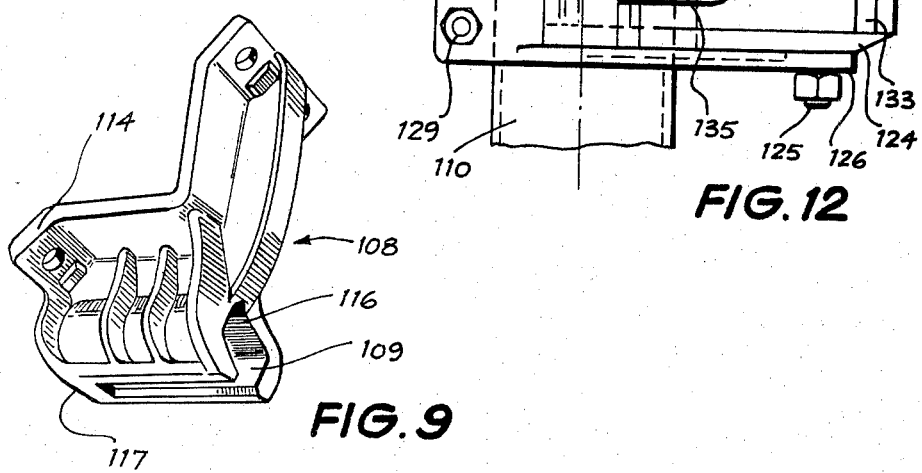
FIG. 9

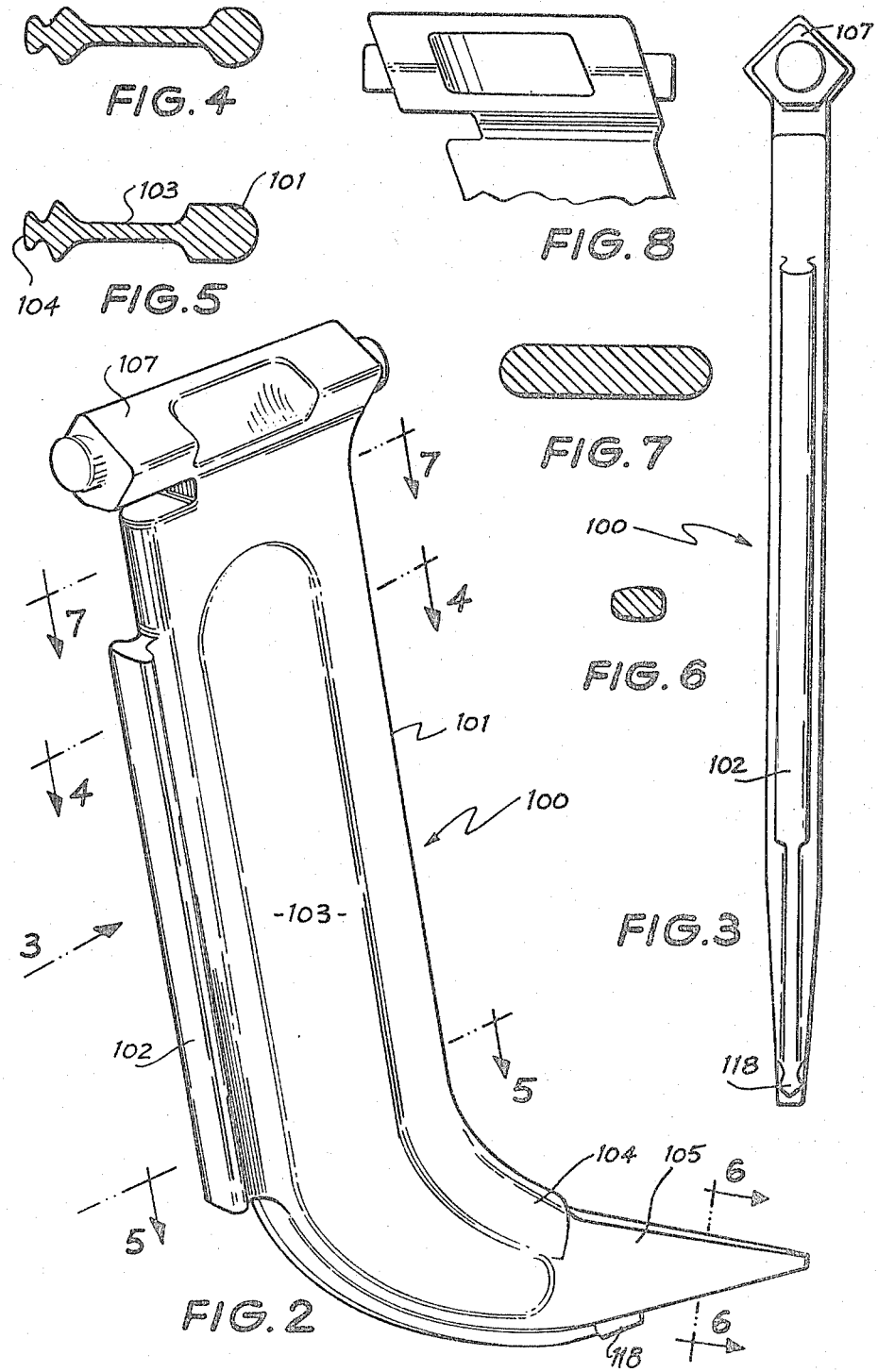

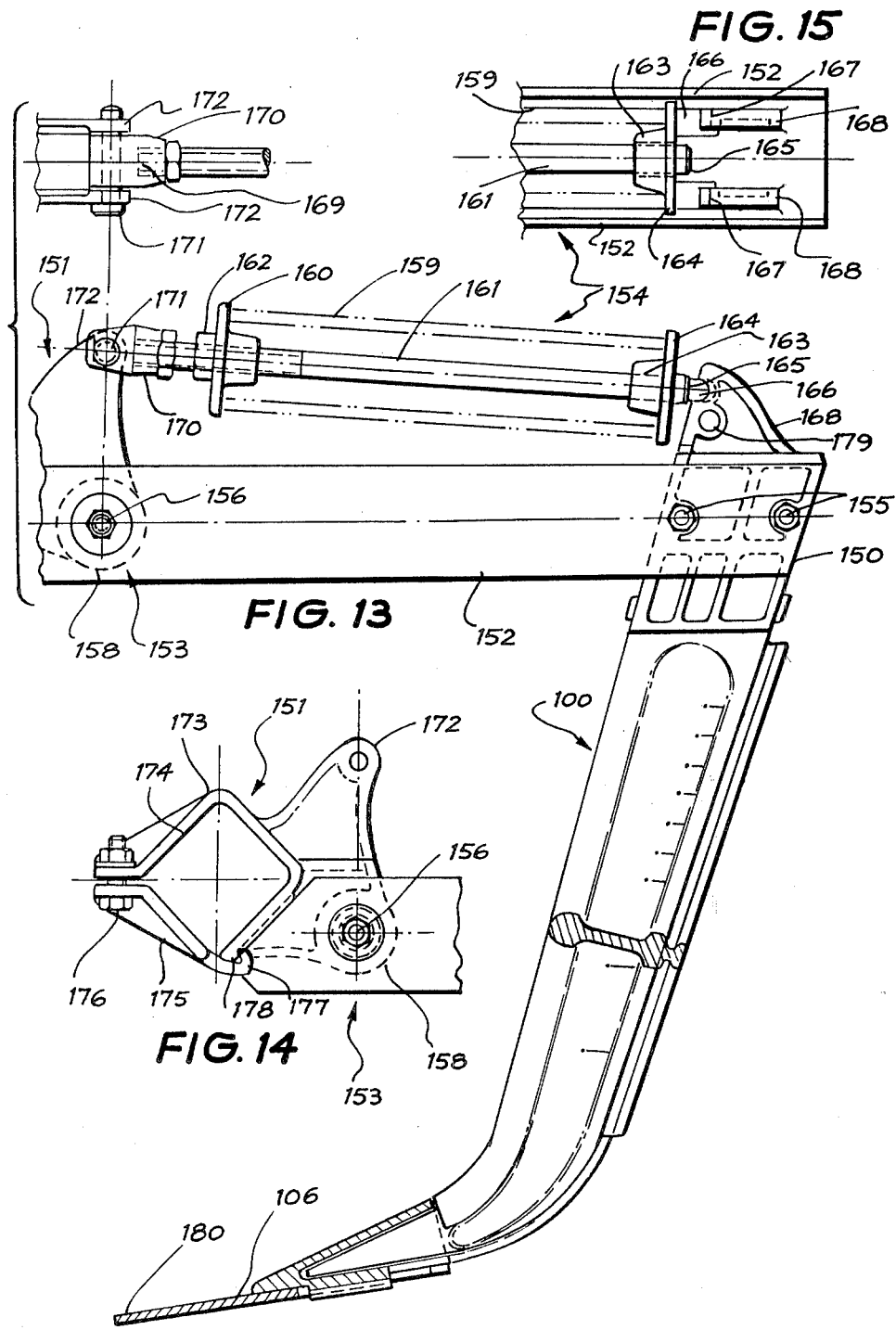

AGRICULTURAL TOOL SHANK AND SPRING RELEASE

This is a continuation of application Ser. No. 932,023 filed Aug. 8, 1978; now abandoned.

FIELD OF THE INVENTION

The present invention relates to ploughing apparatus and more particularly to the shanks thereof, to methods of attaching the shanks to the plough frame, and to the digging points of the shanks.

PRIOR ART

Conventional apparatus used for ploughing have several major disadvantages in that it is usually designed to make several passes of the same piece of ground and/or is designed to invert the soil before the seed and/or fertilizer is deposited below the soil surface. This known method results in the breaking up of the soil structure which is detrimental to the new growth resulting from germination of the newly planted seed. It is also a disadvantage that the worked soil loses its moisture.

More particularly, known shanks are provided with comparatively flat leading surfaces or in other instances with sharp leading edges, supposedly to enable the shank to pass more easily through the soil, however, the flat surface or sharp edge tends to collect crop stubble and residue thus greatly increasing the effective shank width. Also known shanks are generally mounted so as to extend vertically down into the soil.

These above factors all increase the effort required to pull the shank through the soil as they increase the shank's resistance to the passage of soil past the shank. As a further disadvantage this increased resistance caused furrowing.

SUMMARY OF THE INVENTION

It is an object of the present invention to overcome the above disadvantages by providing an improved ploughing system which in the described embodiments assists plant germination and growth while making best use of fertilizer applied to the soil during seeding.

In a first general form, the present invention contemplates a plough shank having a rounded leading edge portion with a leading surface, a trailing portion, a web connecting the trailing and leading portions, attachment means at the top of the shank to enable attachment of the shank to a plough frame so that said leading surface is inclined between 60° to 80° to the horizontal, and means at the bottom of the shank to enable the attaching of a digging point thereto.

BRIEF DESCRIPTION OF THE DRAWINGS

The present invention will now be described by way of example with reference to the accompanying drawings wherein:

FIG. 1 is a perspective view of a plough shank attached to a tool bar;

FIG. 2 is a perspective view of the shank of FIG. 1;

FIG. 3 is an end elevation of the shank of FIG. 2 as seen in the direction 3;

FIG. 4 is a section of the shank of FIG. 2 taken along the line 4—4;

FIG. 5 is a section of the shank of FIG. 2 taken along the line 5—5;

FIG. 6 is a section of the shank of FIG. 2 taken along the line 6—6;

FIG. 7 is a section of the shank of FIG. 2 taken along the line 7—7;

FIG. 8 is a part side elevation of the top portion of the shank of FIG. 2;

FIG. 9 is a perspective view of a portion of the clamp of FIG. 1;

FIG. 11 is a part section of the clamp and shank of FIG. 10;

FIG. 12 is a part plan of the clamp of FIG. 10;

FIG. 13 is a side elevation of a pivotable support, clamp, shank and digging point embodying the present invention;

FIG. 14 is an elevation view of the clamp of FIG. 13;

FIG. 15 is a part plan view of the pivotal support of FIG. 13;

DETAILED DESCRIPTION

Figure 10:
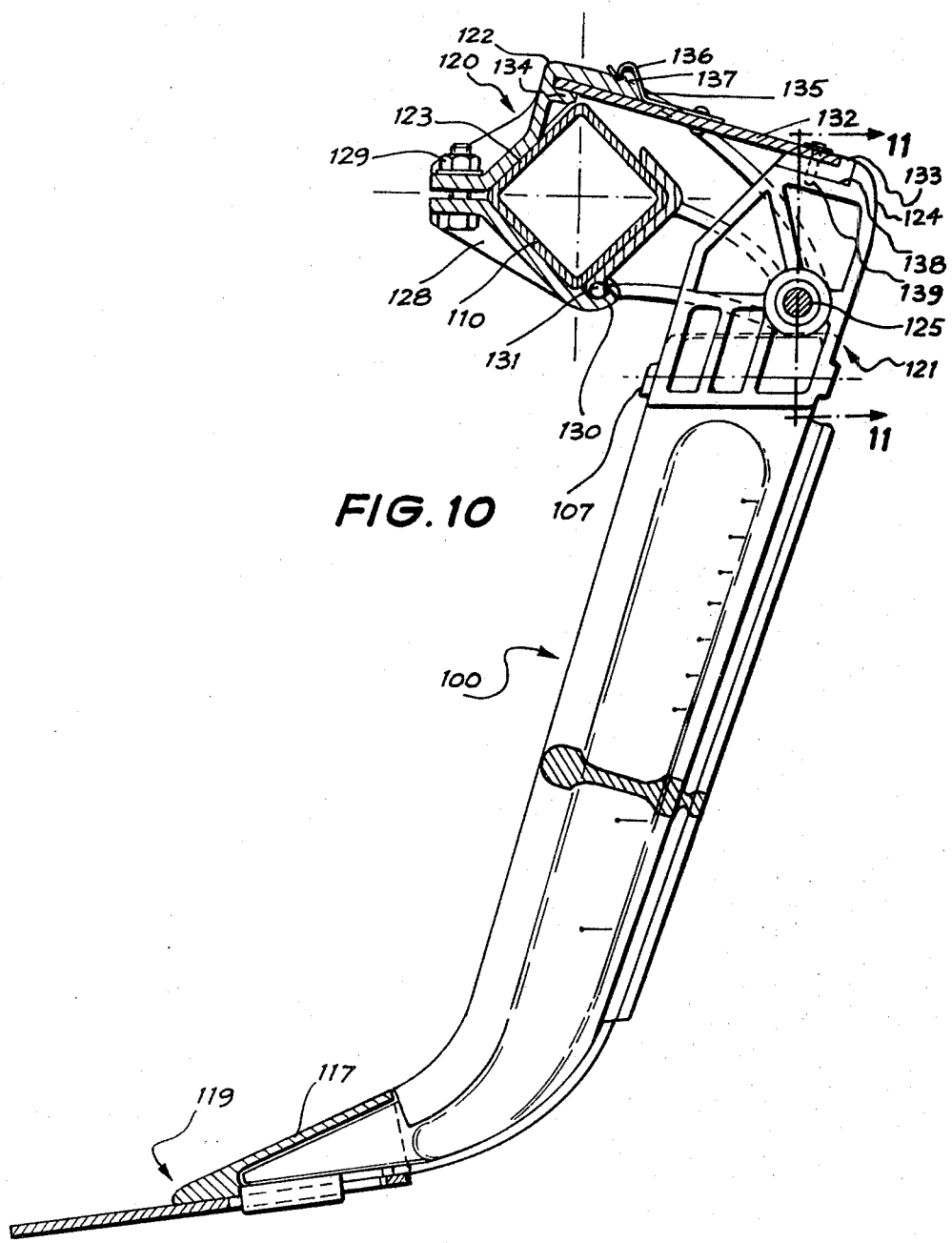
FIG. 10 is a side elevation of a shank, clamp and digging point embodying the present invention.

The apparatus of FIG. 1 comprises a plough shank 100 attached to tool bar 110 of a ploughing frame. The whole frame is not depicted but is intended to be drawn by a tractor. The shank 100 is rigidly attached to bar 110 by means of a clamp 108. The shank 100, as best seen in FIGS. 2 and 3 has a cross-section as shown in FIGS. 4 to 7 with a leading rounded edge portion 101 joined to a trailing edge portion 102 by a web 103. The rounded edge of portion 101 causes crop stubble and residue to slide away from the digging zone, that is the lower portion of the shank 100, thereby substantially eliminating the build up of material on the leading edge. The shank 100 is mounted to be inclined by 60° to 80° to the horizontal so that crop stubble and other material which does not slide away will ride up the shank 100 away from the digging zone. More particularly the leading edge should be inclined by 60° to 80° to the horizontal, and most preferably 75°.

Toward the lower area of the shank 100 there is provided a region 104 of added material to prolong the working life of the shank since it is this region 104 which is subject to high wear.

The shank 100 of FIGS. 1 to 8 provides good resistance to twisting and is of light weight due to its cross-section, as illustrated in FIGS. 4 and 5 in particular. The reduced weight leads to reduced cost of material and ease of handling.

The trailing edge portion 102 is shaped to engage and retain attachments to be fastened to the shank 100.

The bottom portion 105 of the shank 100 is adapted to receive a digging point 106 as seen in FIG. 1 by means of an adaptor 117 engaging projection 118 on the lower part 105 of shank 100.

The upper portion of the shank 101 is adapted to be fitted to the clamp 108 by means of lobed portion 107 which is received in a recess of corresponding shape in the clamp 108. The recess 109, FIG. 9, is tapered to rigidly engage the lobed portion 107 and tapers from the front of the recess 109 to the back with respect to the normal direction of travel of the plough. The recess 109 is elongated at its upper portion so as to provide the slot 116. The slot 116 provides room for inaccuracies in casting the lobed portion 107, since it is usual in the casting of such objects that a casting fin would be left at the upper part of the lobed portion 107.

The clamp comprises an upper part 112 which extends over the bar 110 and defines with lower part 111 (see FIG. 9) a recess of corresponding cross-section to the bar 110. The parts 111 and 112 are clamped together by four bolts 113. Located around each bolt 113 and between the flanges 114 and 115 are rubber rings so that if the shank 100 is subjected to an overload and the nuts threadably engaging bolts 113 are stripped, the bolts 113 will be retained in position by the rings. This facilitates the easy replacement of the nuts and prevents the loss of bolts 113. The lower part is provided with recess 109. The end of recess 109 is provided with a strap 117 to prevent the complete movement of lobed portion 107 through the recess 109 by limiting outward deflection of the walls of recess 109.

Turning now to FIGS. 10 to 12 wherein the shank 100 is pivotally attached to the bar 110 by means of clamp 120, having pivot 121.

The clamp 120 has three basic parts, the first is upper part 122 which extends over the bar 110, and which defines part of recess 123 which is of corresponding shape to the bar 110. The upper part 122 terminates at the pivot 121. The second part is the adaptor 124 which defines another part of recess 123 and which is pivotally attached to upper part 122 by pin 125. The pin 125 extends through passage 127 formed in adaptor 124. The third part is closure member 128 which is provided to lock the bar 110 in recess 123. Member 128 is held in position by being bolted to upper part 122 by bolts 129 and by having a hooked end 130 which engages a lobe 131 on upper part 122. To hold the shank 100 in an operative digging position, a leaf spring 132 extends between upper part 122 and adaptor 124. During normal operation, the spring 132 is in compression, however upon the load on the shank 100 exceeding a predetermined limit the spring 132 will jump over lip 133 formed in adaptor 124 thus allowing the shank 100 to pivot upon striking an obstacle. Thus the spring 132 is a safeguard against overload. The spring 132 is attached to upper part 122 by slot 134 and clip 135. The clip 135 allows easy replacement of the spring 132 and is provided with a raised section 136 which engages a lobe part 137 on the upper part 122. In operation, if the spring 132 is triggered from the position depicted, then to return the shank 100 to its normal operative position, it is only necessary to cause clockwise rotation of the shank 100, by for example reversing the direction of travel of the plough.

The adaptor 124 is provided with a wear member 138 which is engaged by the spring 132 and has the lip 133. The interface between the spring end and the lip 133 is inclined at approximately 85° to the longitudinal axis of the spring 132 to enable the spring, upon being overloaded, to ride over the lip 133. The wear member 138 is held in position by screw 139. A flat surface 140 is formed in the wear member 138 and is engaged by the spring 132 to ensure that the shank 100 does not move during travel in a raised position. Additionally the spring 132 is rounded at its end adjacent the upper part 122 to allow movement of the spring 132 at that end. This enables correct location of the spring 132 on the wear member 138.

More specifically regarding the clamp 120 it should be noted that it is adapted to engage the bar 110, with the bar 110 orientated such that its longitudinal side faces are inclined 45° to the horizontal. In previous arrangements the two longitudinal faces are vertical while the other two are horizontal. The present arrangement has the advantage that the inner faces of the clamp 120 frictionally engage the outer surfaces of the bar to thus reduce the force required by the bolts 129 to hold the clamp 120 together. It should further be noted that there are only two bolts 129 employed as the clamp 120 utilizes the hook end and the lobe 131. This provides superior strength, ease of assembly and reduces the necessity to have the bolts 129 absolutely tight since the clamping action is not totally dependent of the bolts 129.

Under normal conditions the rate of wear of the different parts of a plough is in the order of the digging point first and then the shank. With conventional shanks the clamp, or at least part thereof, is integral with the shank, thus upon the shank becoming worn beyond a point where it becomes inefficient the shank and clamp are discarded. With the present shank 100 it should be noted that the clamp 120 is not discarded when the shank has exceeded its working life.

Now with reference to FIGS. 13 to 15 wherein an alternative method of coupling the shank 100 to the bar 110 of the plough frame is depicted, it can be seen that the shank 100 is of similar shape and configuration to that of FIGS. 2 to 8. However the shank 100 is supported by an adaptor 150 pivotally coupled to the clamp 151 by bars 152 and pivot 153. To hold the shank 100 in an operative position, the compression spring assembly 154 is provided between the adaptor 150 and the clamp 151.

Bars 152 are bolted to adaptor 150 by bolts 155 and are pivotally attached to clamp 151 by pin 156 which extends through a hole in each of bars 152 and through the projection 158 of clamp 151. The spring assembly 154 consists of a compression spring 159 clamped between two plates 160 and 164 by means of a rod 161 threadably engaging nut 162. The force exerted by the spring 159 on the adaptor 150 may be adapted by movement of the nut 162 along the rod 161. The end 165 of the rod 161 remote from nut 162 passes through a passage 163 formed in the plate 164 so that upon sufficient force being applied to the shank 100 the spring is compressed and the end 165 of the rod 161 will move to the right through passage 163. With this configuration it can be seen that although the shank 100 may move through a large angle in order to overcome an obstacle, the force exerted by the spring 159 is not greatly increased since the relative movement between ends of the spring 159 are comparatively much smaller. Consequently, the force applied by the spring 159 is reasonably constant.

The plate 164 is formed with two male projections 166 which engage a female socket 167 formed in raised parts 168 of the adaptor 150. The end 169 of the rod 161 is threadably engaged in pivot member 170 which is rotatable about pin 171. Pin 171 is supported by passing through raised portions 172 formed on the clamp 151.

A particular advantage of the present arrangement is the location of the leading edge 180 of the digging point 106 approximately below the pivot 153. This enables the maintaining of a relatively constant digging angle since small deflections of the digging point 106 from the position depicted will not greatly alter the digging angle.

The clamp 151 is similar in construction to clamp 120 in that it is of two major parts, an upper part 173 having a shaped recess 174 to receive the bar 110 (FIG. 1) and a closure member 175 to close the clamp 151. The two parts are held together by bolts 176 and by the engagement of hook portion 177 with the lobe 178.

The adaptor 150 is provided with holes 179 to receive a hydraulic ram which may be used in place of spring assembly 154. If a hydraulic ram is employed it would be advantageous to pulsate the ram to cause back and forth movement of the digging point in the general direction of travel of the plough.

The arrangement of FIGS. 13 to 15, if required to provide further obstacle jumping action, may be modified so that the adaptor 150 is pivotally attached to the bars 152. With this modification the bars 152 and/or adaptor 150 would require to have abutment surfaces to limit clockwise movement of the shank 100 beyond a predetermined position. Accordingly a double action is achieved in that under normal load the shank 100 pivots about pin 156, however upon encountering an obstacle, for example a stump, the shank will pivot about a pivot pin connecting the adaptor 150 and bars 152.

Figures 16, 17, 18:
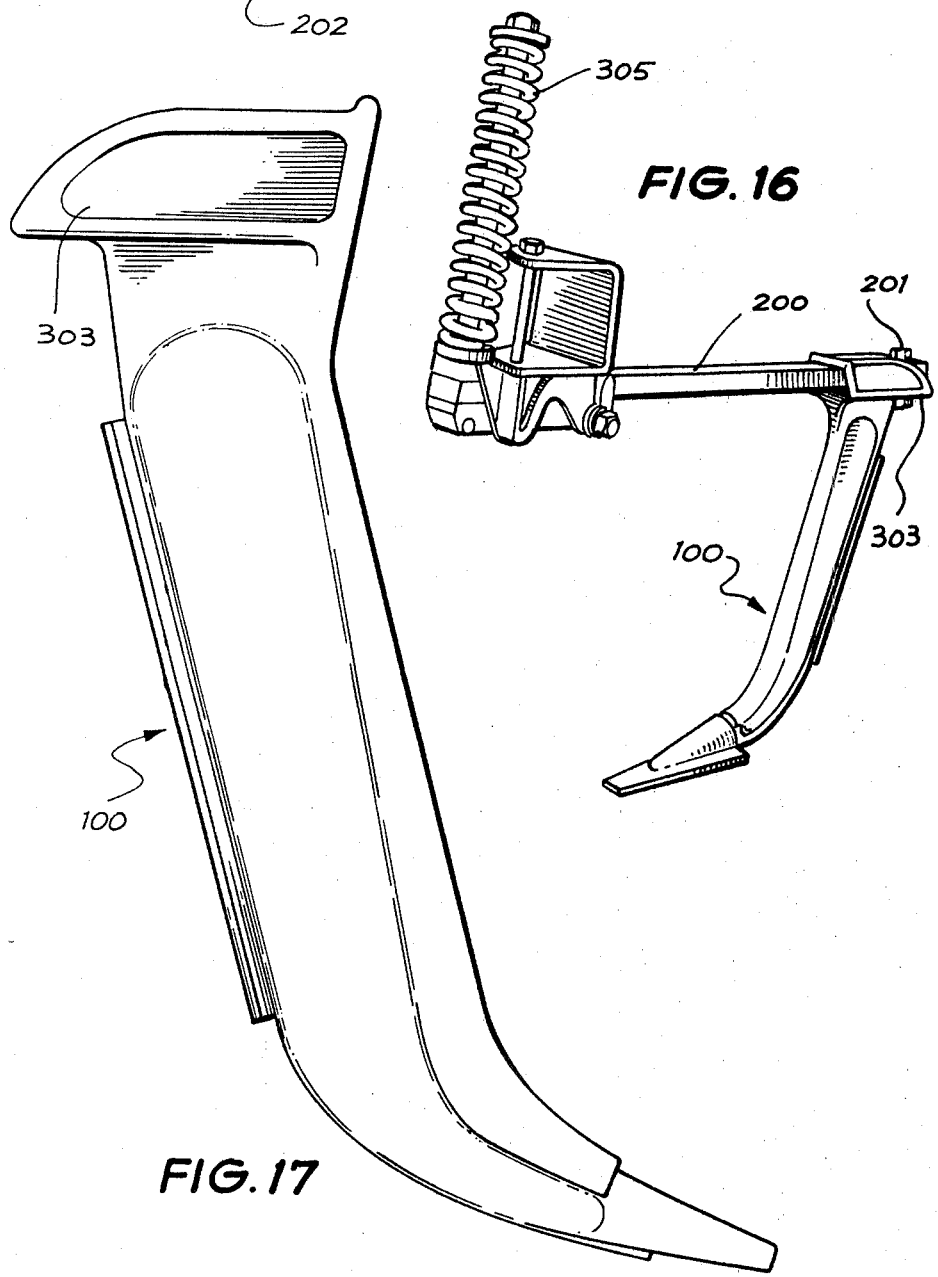
FIG. 16 is a perspective view of a flexible support, clamp, shank and digging point embodying the present invention.
FIG. 17 is an elevation view of the shank of FIG. 16.
FIG. 18 is a plan view of the shank of FIG. 16.

Referring now to FIGS. 16 to 18 wherein a further embodiment is depicted, the shank 100 is attached to a leaf spring 200 by means of bolt 201. The leaf spring 200 passess through a passage 202 formed in the top portion 303 of the shank. The shank is allowed to pivot under extreme load by movement about the pivot pin 304 and the subsequent compression of spring 305 which biases the shank 100 to the position depicted.

It should be appreciated that the shank 100 and various means for attaching the shank 100 to the tool bar 110 are intended to locate the digging point 106 so that it is inclined to the horizontal by 5° to 15°, most preferably 8°. In this orientation the digging point 106 offers less resistance to movement through the soil.

I claim:

1. A rigid plough shank for use in soil, including: a generally vertical upper part attachable to a plough frame for being drawn thereby, and a lower part adapted to receive and support a digging point; said upper part having a leading portion with a leading surface having a rounded horizontal profile; a trailing portion; a web connecting the trailing and leading portions; said leading and trailing portions having a transverse width greater than that of said web, whereby the shank has a horizontal cross-section for inhibiting flexure of the shank as it moves through the soil, so that the digging point attached thereto is held at a substantially fixed location relative to the plough frame and in a substantially fixed attitude; attachment means disposed at the top of the shank, permitting attachment of the shank to a plough frame, whereby, said leading surface is inclined rearwardly and upwardly by 60° to 80° to the horizontal, said inclination in combination with said profile, inhibiting collection of trash on the shank in use; said lower part having a generally horizontal forwardly extending portion and means for receiving and supporting a digging point, and further defined by said leading surface terminating in a forwardly facing arcuate section joining said upper and lower parts inhibiting wear of the shank in that region of the shank and to enhance soil flow past the shank in that region.

2. The shank of claim 1 wherein: said leading surface in use is inclined at approximately 75° to the horizontal.

3. The shank of claim 1 wherein: said attachment means comprises a lobe formed integral with the sahnk, said lobe being adapted to be received in a clamp for attachment to a tool bar.

4. The shank of claim 3, wherein said lobe is tapered so as to diverge in the normal direction of travel of the shank.

5. The shank of any one of claims 2, 3 or 4 wherein said trailing portion includes means to receive an implement to carry out a further cultivating function.

6. A combination comprising a rigid plough shank for use in soil, including: a generally vertical upper part attachable to a plough frame for being drawn thereby, and a lower part, said lower part receiving and supporting a digging point; said upper part having a leading portion with a leading surface having a rounded horizontal profile; a trailing portion; a web connecting the trailing and leading portions; said leading and trailing portions having a transverse width greater than that of said web, whereby the shank has a horizontal cross-section for inhibiting flexure of the shank as it moves through the soil and the digging point attached thereto, is held at a substantially fixed location relative to the plough frame and in a substantially fixed attitude; attachment means disposed at the top of the shank for attachment of the shank to a plough frame, and said leading surface is inclined by 60° to 80° to the horizontal, said inclination in combination with said profile inhibit collection of trash on the shank in use; said lower part having a generally horizontal extending portion with means for receiving and supporting the digging point, and having said leading surface terminating in a forwardly facing arcuate section joining said upper and lower parts for inhibiting wear of the shank in that region of the shank and to enhance soil flow past the shank in that region; and a clamp for securely engaging said attachment means, said clamp being further adapted to secure the shank to a tool bar.

7. The combination of claim 6 wherein: said attachment means comprises a lobe formed integral with said shank, and said clamp being provided with a recess of corresponding shape to said lobe to thereby clampingly receive said lobe.

8. The combination of claim 7, wherein: said lobe is tapered so as to converge rearwardly with respect to the normal direction of travel of the shank.

9. The combination of claim 8, wherein: said lobe is of generally square or rectangular cross-section.

10. The combination of claim 7 wherein said clamp comprises a shank engaging first portion having said recess, a tool bar engaging second portion, pivot means joining said first and second portions, and bias means engaging said first and second portions biasing said first portion to a predetermined position.

11. The combination of claim 10 wherein said bias means is a leaf spring attached to one of said portions and engaging a lip on the other of said portions so that when in use the load on said shank exceeds a predetermined load and said spring overrides said lip to allow pivoting movement of said shank.

12. The combination of claim 10 wherein said pivot means comprises a generally horizontal longitudinally extending member attached to said first portion and pivotally attached to said second portion; said first and second portions each having a projection extending above said extending member, and said bias means extends between the projections.

13. The combination of claim 12 wherein said extending member is fixed rigidly to said first portion.

14. The combination of claim 12 wherein said extending member is pivotally attached to said first portion.

15. The combination of claim 13 or 14 wherein said bias means comprises a compression spring.

16. The combination of claim 13 or 14 wherein said bias means comprises a hydraulic ram.

17. The shank of claim 1 wherein said attachment means includes a passage extending through an enlarged portion of said shank, said passage being adapted to receive a leaf spring.

18. A combination comprising the shank of claim 17 and said leaf spring attached thereto and extending through said passage.

* * * * *